(12) United States Patent
Dai

(10) Patent No.: US 9,895,995 B2
(45) Date of Patent: *Feb. 20, 2018

(54) POWER MANAGEMENT IN ELECTRIC VEHICLES

(71) Applicant: THUNDER POWER NEW ENERGY VEHICLE DEVELOPMENT COMPANY LIMITED, Central (HK)

(72) Inventor: Yu-Ting Dai, New Taipei (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/230,293

(22) Filed: Aug. 5, 2016

(65) Prior Publication Data

US 2016/0339797 A1 Nov. 24, 2016

Related U.S. Application Data

(63) Continuation of application No. 14/748,210, filed on Jun. 23, 2015, now Pat. No. 9,499,067.
(Continued)

(51) Int. Cl.
*B60L 11/18* (2006.01)
*H01M 10/42* (2006.01)

(52) U.S. Cl.
CPC ....... *B60L 11/1864* (2013.01); *H01M 10/425* (2013.01); *H01M 2010/4271* (2013.01); *H01M 2010/4278* (2013.01); *H01M 2220/20* (2013.01)

(58) Field of Classification Search
CPC ............. B60L 11/1864; H01M 10/425; H01M 2010/4271; H01M 2010/4278; H01M 2220/20
See application file for complete search history.

(56) References Cited

U.S. PATENT DOCUMENTS 3,930,192 A 12/1975 Dinkler
5,666,040 A 9/1997 Bourbeau
(Continued)

FOREIGN PATENT DOCUMENTS

AU 2008200543 A1 8/2009
JP 2009294338 A 12/2009
(Continued)

OTHER PUBLICATIONS

U.S. Appl. No. 14/748,187, filed Jun. 23, 2015, Non-Final Rejection dated Mar. 21, 2017, all pages.
(Continued)

*Primary Examiner* — Aaron L Troost
(74) *Attorney, Agent, or Firm* — Kilpatrick Townsend & Stockton LLP

(57) ABSTRACT

Various techniques described herein relate to electric vehicle power management system for managing a plurality of battery modules in a battery pack. Such electric vehicle power management system may include a plurality of battery management systems corresponding to a plurality of battery modules, and an energy management system for managing the plurality of battery management systems. The energy management system and the plurality of battery management systems may adopt master-slave wireless communication, and may use a single wireless frequency channel or a plurality of assigned wireless frequency channels.

15 Claims, 7 Drawing Sheets

Related U.S. Application Data

(60) Provisional application No. 62/150,848, filed on Apr. 22, 2015, provisional application No. 62/133,991, filed on Mar. 16, 2015.

(56) References Cited

U.S. PATENT DOCUMENTS

| | | | |
|---|---|---|---|
| 5,710,504 | A | 1/1998 | Pascual et al. |
| 7,332,242 | B2 | 2/2008 | Sato et al. |
| 8,159,191 | B2 | 4/2012 | Chang et al. |
| 8,564,246 | B2 | 10/2013 | Wade et al. |
| 8,571,738 | B1 | 10/2013 | Potter et al. |
| 8,796,881 | B2 | 8/2014 | Davis |
| 8,798,832 | B2 | 8/2014 | Kawahara et al. |
| 9,499,067 | B2 | 11/2016 | Dai |
| 9,601,733 | B2 | 3/2017 | Sham |
| 9,610,857 | B2 | 4/2017 | Dai |
| 2004/0113589 | A1 | 6/2004 | Crisp et al. |
| 2008/0042493 | A1 | 2/2008 | Jacobs |
| 2009/0139781 | A1 | 6/2009 | Straubel et al. |
| 2009/0146610 | A1 | 6/2009 | Trigiani |
| 2011/0001456 | A1 | 1/2011 | Wang |
| 2011/0309796 | A1 | 12/2011 | Firehammer |
| 2012/0105001 | A1 | 5/2012 | Gallegos et al. |
| 2012/0116699 | A1 | 5/2012 | Haag et al. |
| 2012/0303397 | A1 | 11/2012 | Prosser |
| 2012/0313562 | A1 | 12/2012 | Murao et al. |
| 2013/0124038 | A1 | 5/2013 | Naboulsi |
| 2013/0136975 | A1 | 5/2013 | Uchida |
| 2013/0144470 | A1 | 6/2013 | Ricci |
| 2013/0179061 | A1 | 7/2013 | Gadh et al. |
| 2013/0217409 | A1 | 8/2013 | Bridges et al. |
| 2013/0221926 | A1 | 8/2013 | Furtner |
| 2014/0017528 | A1 | 1/2014 | Uehara et al. |
| 2014/0021924 | A1* | 1/2014 | Abe .................. H01M 10/44 320/118 |
| 2014/0167655 | A1 | 6/2014 | Chatroux et al. |
| 2014/0203782 | A1 | 7/2014 | Xue et al. |
| 2014/0247135 | A1 | 9/2014 | Proud |
| 2014/0354291 | A1* | 12/2014 | Kikuchi .............. H01M 10/441 324/434 |
| 2014/0365792 | A1 | 12/2014 | Yun |
| 2015/0044522 | A1 | 2/2015 | Camp et al. |
| 2015/0069974 | A1* | 3/2015 | Okada ................ G01R 31/3658 320/134 |
| 2015/0091698 | A1 | 4/2015 | Du |
| 2015/0017642 | A1 | 6/2015 | Kato |
| 2015/0171642 | A1 | 6/2015 | Kato et al. |
| 2015/0188334 | A1 | 7/2015 | Dao et al. |
| 2016/0056510 | A1 | 2/2016 | Takeuchi et al. |
| 2016/0272082 | A1 | 9/2016 | Chuang |
| 2016/0272083 | A1 | 9/2016 | Dai |
| 2016/0272084 | A1 | 9/2016 | Chuang |
| 2016/0272085 | A1 | 9/2016 | Dai |
| 2016/0276638 | A1 | 9/2016 | Sham |
| 2016/0276854 | A1 | 9/2016 | Lai |
| 2016/0276855 | A1 | 9/2016 | Lian |
| 2016/0325638 | A1 | 11/2016 | Dai |

FOREIGN PATENT DOCUMENTS

| | | |
|---|---|---|
| WO | 2014/103008 A | 7/2014 |
| WO | 2014103008 A1 | 7/2014 |
| WO | WO-2014103008 A1 * | 7/2014 |

OTHER PUBLICATIONS

U.S. Appl. No. 14/883,599, filed Oct. 14, 2015, Final Rejection dated Nov. 25, 2016, all pages.
U.S. Appl. No. 14/883,599, filed Oct. 14, 2015, Non-Final Rejection dated Mar. 24, 2017, all pages.
U.S. Appl. No. 14/967,359, filed Dec. 14, 2015, Final Rejection dated Nov. 7, 2016, all pages.
U.S. Appl. No. 14/967,360, filed Dec. 14, 2015, Non-Final Rejection dated Dec. 1, 2016, all pages.
U.S. Appl. No. 14/967,364, filed Dec. 14, 2015, Non-Final Rejection dated Mar. 7, 2016, all pages.
U.S. Appl. No. 14/967,364, filed Dec. 14, 2015, Notice of Allowance dated Nov. 22, 2016, all pages.
U.S. Appl. No. 15/006,126, filed Jan. 26, 2016, Notice of Allowance dated Nov. 7, 2016, all pages.
U.S. Appl. No. 14/967,364 , "Non-Final Office Action", dated Mar. 7, 2016, 16 pages.
U.S. Appl. No. 14/967,364 , "Notice of Allowance", dated Jun. 3, 2016, 14 pages.
U.S. Appl. No. 15/006,126, filed Jan. 26, 2016, Non-Final Office Action dated Jul. 25, 2016, all pages.
U.S. Appl. No. 14/967,364, filed Dec. 14, 2015, Final Office Action dated Aug. 2, 2016, all pages.
U.S. Appl. No. 14/967,360, Final Office Action dated Aug. 3, 2016, all pages.
U.S. Appl. No. 14/967,360, Non-Final Office Action dated Apr. 4, 2016, all pages.
U.S. Appl. No. 14/967,360, Final Office Action dated Nov. 7, 2016, all pages.
U.S. Appl. No. 14/967,359, filed Dec. 14, 2015, Non-Final Office Action dated Apr. 1, 2016, all pages.
U.S. Appl. No. 14/883,599, filed Oct. 14, 2015, Non-Final Office Action dated Apr. 5, 2016, all pages.
U.S. Appl. No. 14/748,210, filed Jun. 23, 2015, Notice of Allowance dated Jun. 3, 2016, all pages.
Niels Jegenhorst et al: : "Entwicklung eines Zellensensors fur Fahrzeugbatterien mit bidirektionaler drahtloser Kommunikation" Oct. 27, 2011 (Oct. 27, 2011), pp. 1-413, XP055296336, Hamburg, Retrieved from the Internet: URL:http://edoc.sub.uni-hamburg.de/hawjvolltexte/2012/1535/pdf/Masterarbeit.pdf.
Shema Ann Mathew et al: "A smart wireless battery monitoring system for Electric Vehicles" Intelligent Systems Design and Applications (ISDA), 2012 12th International Conference on, IEEE, Nov. 27, 2012 (Nov. 27, 2012), pp. 189-193.
Matthias Schneider et al: "Automotive battery monitoring by wireless cell sensors", 2013 IEEE International Instrumentation and Measurement Technology Conference (I2MTC) IEEE, May 13, 2012 (May 13, 2012), pp. 816-820.
Damian Alonso et al: "Towards a Wireless Battery Management System: Evaluation of Antennas and Radio Channel Measurements Inside a Battery Emulator", 2014 IEEE 80th Vehicular Technology Conference (VTC2014-FALL), Sep. 2014 (Sep. 2014), pp. 1-5.
Roscher Valentin et al: "Synchronisation using wireless trigger-broadcast for impedance spectroscopy of battery cells" 2015 IEEE Sensors Applications Symposium (SAS), IEEE, Apr. 13, 2015 (Apr. 13, 2015), pp. 1-6.
European Search Report dated Aug. 30, 2016 in European Patent Application No. 16160450.9, all pages.
European Search Report for EP 16160486 dated Jul. 6, 2016, all pages.
U.S. Appl. No. 15/215,254 filed Jul. 20, 2016, Non-Final Rejection dated Sep. 18, 2017, all pages.

* cited by examiner

POWER MANAGEMENT IN ELECTRIC VEHICLES

CROSS-REFERENCE TO RELATED APPLICATIONS

This Continuation Application claims the benefit of U.S. Non-Provisional application Ser. No. 14/748,210, filed Jun. 23, 2015 which claims priority to U.S. Provisional Patent Application No. 62/133,991, filed Mar. 16, 2015, and entitled "IMPROVEMENTS TO ELECTRIC VEHICLES." The present application is also a non-provisional of and claims priority to U.S. Provisional Patent Application No. 62/150,848, filed Apr. 22, 2015, and entitled "IMPROVEMENTS TO ELECTRIC VEHICLES" which are herein incorporated by reference in their entirety for all purposes.

FIELD OF THE INVENTION

The present invention relates to a power management systems for electric batteries, for example, batteries within electric vehicle motors and other electric devices.

BACKGROUND OF THE INVENTION

Battery charging and power management technologies are an important part of the development of new electric battery-powered devices, such as electric vehicles. For example, a plurality of battery modules may be the power source of an electric vehicle and may play an important role in the operation of the electric vehicle. Effective management and monitoring of the battery may be a critical technology, and thus the battery management system becomes an essential part of the electric vehicle. Battery management systems in electric vehicles may monitor battery voltage, current, temperature, and other battery parameters and conditions necessary to ensure the effective operation of the battery. Such data may be stored and provided to various control circuits and systems within the battery pack and/or within the electric device (e.g., a vehicle control unit of an electric vehicle). In some cases, battery packs may use pluralities of replaceable battery modules, creating complications and difficulties for ongoing monitoring and management of the battery modules.

BRIEF SUMMARY OF THE INVENTION

In view of the above, the present invention relates to power management systems for electric devices, such as electric vehicles.

Certain aspects of the present invention relate to power management system for electric vehicle. Electric vehicle power management systems may be used to manage a plurality of battery modules, and each battery module in the plurality of battery modules may comprises one or more battery cells. Such electric vehicle power management systems may comprise a plurality of battery management systems (BMS), wherein each battery management system in the plurality of battery management systems (BMS) is connected with a corresponding battery module for managing one or more battery cells in the corresponding battery module. An energy management system (EMS) may manage the plurality of battery management systems. The electric vehicle power management system may further comprise a wireless data channel consisting of one or more wireless frequency channels for data communication between the energy management system and the plurality of battery management systems. The energy management system also may include an energy management processor and an energy management communication module. Each battery management system may include a battery management processor and a battery management communication module, and also may be provided with a unique battery management system address. The energy management communication module may use the wireless frequency channel to simultaneously send a command to each of the battery management systems, and the command may carry an address identifying a currently selected battery management system. Each of the battery management communication modules may receive the command from the energy management communication module, and may use their respective battery management processors to determine whether or not to process and answer the received command based on the address in the command. The battery management processor of the currently selected battery management system may determine that judges that there is a need to process and answer the received command, and may then process and respond to the received command.

According to additional aspects of the present invention, electric vehicle power management systems may be provided. The electric vehicle power management systems may be used for managing a plurality of battery modules, wherein each battery module in the plurality of battery modules comprises one or more battery cells. The electric vehicle power management systems may comprises a plurality of battery management systems (BMS), wherein each battery management system in the plurality of battery management systems corresponds to a battery module, and each battery management system may be used for managing one or more battery cells in the battery module. An energy management system (EMS) may manage the plurality of battery management systems. Electric vehicle power management systems may further comprise a wireless data channel, the wireless data channel consists of a plurality of wireless frequency channels, and each battery management system in the plurality of battery management systems may use a corresponding wireless frequency channel in the plurality of wireless frequency channels to communicate with the energy management system. The energy management system may include an energy management communication module, and each battery management system in the plurality of battery management systems (BMS) may include a battery management communication module. The energy management communication module may use the wireless frequency channels to send a command to one battery management system in the plurality of battery management systems, or to multiple battery management systems in the plurality of battery management systems simultaneously. The one or multiple battery management systems in the plurality of battery management systems may receive the command through their respective battery management communication modules, process and respond to the command after receiving the command.

According to the further aspects of the present invention, battery packs of electric vehicles may be provided. Such battery packs may include a plurality of battery modules, and the battery packs may use the electric vehicle power management system according to the embodiments described herein.

In still further aspects of the present invention, electric vehicles may be provided, the electric vehicles including the battery pack of the electric vehicle and/or electric vehicle power management systems according to the embodiments described herein.

Various embodiments described herein may have certain advantages over techniques, for example, avoiding large numbers of wirings in electric vehicle battery packs and thus saving space with such battery packs. Additionally, less or none of the communication wire joints may be required in some cases, and thus battery module groups may be more convenient to replace, and vehicle stability problems resulting from loss of communication with battery modules may be more effectively prevented.

BRIEF DESCRIPTION OF THE DRAWINGS

The present invention will be further described in detail with reference to the accompanying drawings

DETAILED DESCRIPTION

Figure 1A:
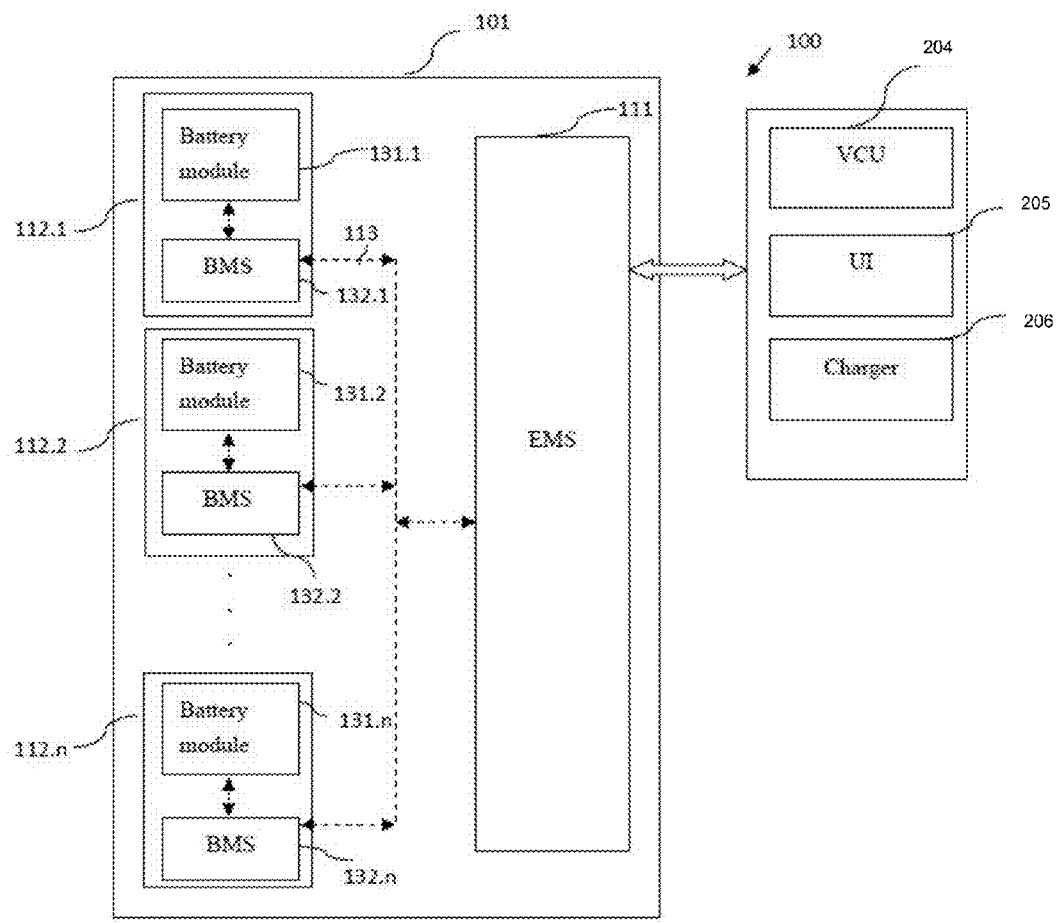
FIG. 1A shows a data exchanging diagram of an electric vehicle power management system in accordance with one or more embodiments of the present invention.

Embodiments of the electric vehicle power management system of the present invention will be described below with reference to the accompanying drawings.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Various embodiments of the present invention will be described below with reference to the drawings constituting a part of the description. It should be understood that, although terms representing directions are used in the present invention, such as "front", "rear", "upper", "lower", "left", "right", and the like, for describing various exemplary structural parts and elements of the present invention, these terms are used herein only for the purpose of convenience of explanation and are determined based on the exemplary orientations shown in the drawings. Since the embodiments disclosed by the present invention can be arranged according to different directions, these terms representing directions are merely used for illustration and should not be regarded as limitation. Wherever possible, the same or similar reference marks used in the present invention refer to the same components.

The term "computer-readable medium" includes, but is not limited non-transitory media such as portable or fixed storage devices, optical storage devices, and various other mediums capable of storing, containing or carrying instruction(s) and/or data. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium. A processor(s) may perform the necessary tasks.

Various techniques (e.g., systems, circuits, methods, non-transitory computer-readable storage memory storing a plurality of instructions executable by one or more processors, etc.) are described herein relating to electric vehicle power management system for managing a plurality of battery modules in a battery pack. Such electric vehicle power management system may include a plurality of battery management systems corresponding to a plurality of battery modules, and an energy management system for managing the plurality of battery management systems. The energy management system and the plurality of battery management systems may adopt master-slave wireless communication, and may use a single wireless frequency channel or a plurality of assigned wireless frequency channels.

In certain embodiments described herein, a plurality of battery management systems (BMS) 132.1, 132.2, ..., 132.n corresponding to a plurality of battery modules 131.1, 131.2, ..., 131.n may communicate with an energy management system (EMS) 111 through wireless data channels.

Figure 1B:
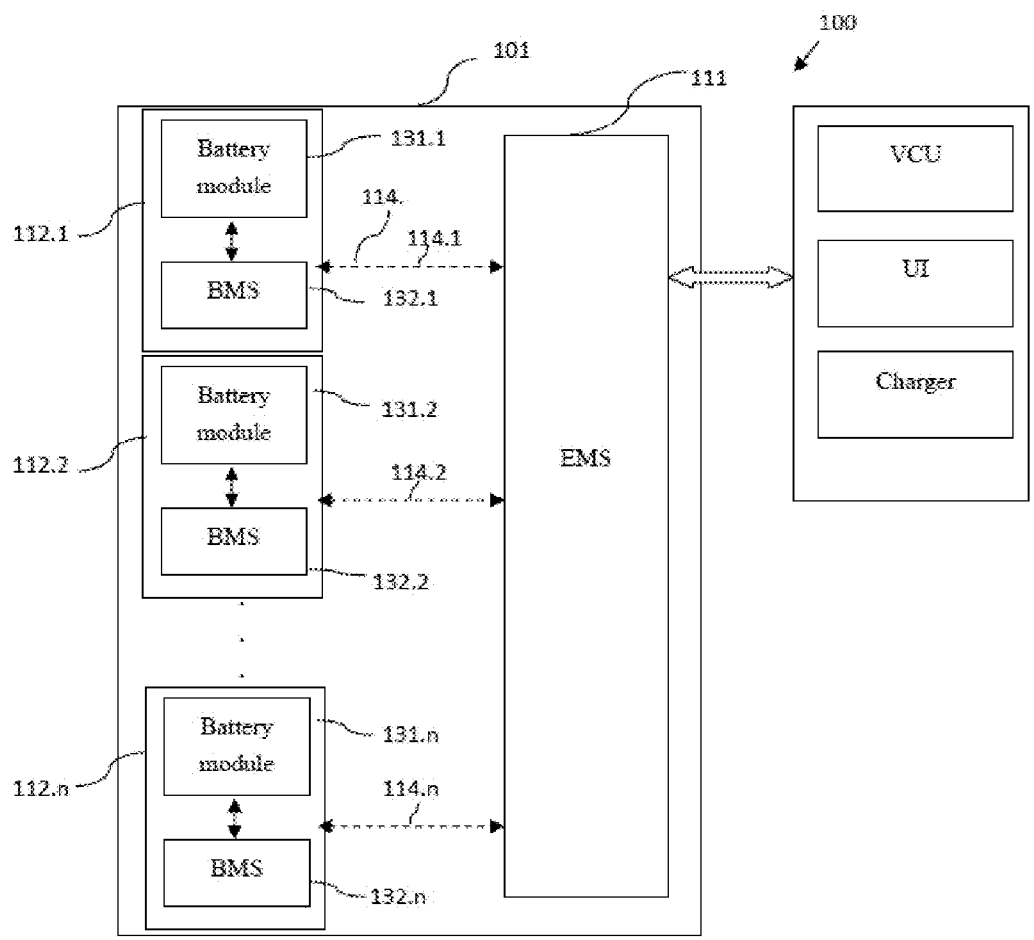
FIG. 1B shows a data exchanging diagram of the electric vehicle power management system in accordance with one or more embodiments of the present invention.

FIG. 1A shows a data exchanging diagram of an electric vehicle power management system in accordance with one or more embodiments, and FIG. 1B shows another example of a data exchanging diagram of an electric vehicle power management system in accordance with one or more embodiments. As shown in FIG. 1A and FIG. 1B, power management systems 100 described herein may manage and monitor a battery pack 101. The battery pack 101 may include a plurality of battery modules 131.1, 131.2, ..., 131.n, each battery module 131.i (i=1, 2, ... n) being connected with one BMS 132.i (i=1, 2, ... n) for managing one or more battery cells in the corresponding battery module 131.i. A battery module 131.i and its corresponding BMS 132.i may form a replaceable battery module group 112.i (i=1, 2, ... n), and in the case of malfunction of the currently used battery module group 112.i, may be replaced by an alternative battery module group.

The power management system 100 may further include an energy management system (EMS) 111, the EMS 111 may be used for managing the plurality of BMS 132.1, 132.2, ..., 132.n, and the EMS 111 may be connected with the BMS 132.1, 132.2, ..., 132.n through wireless data channels 113, 114. Since connection is achieved by the wireless data channels 113, 114, a large number of wirings are avoided, and the overall space of the battery pack 101 may be reduced. Meanwhile, as no communication wire joint may be needed, the problem of communication wire joint loss resulting from replacement of the battery module group 112.i may be potentially avoided, and thus the stability may be reinforced.

Figure 2:
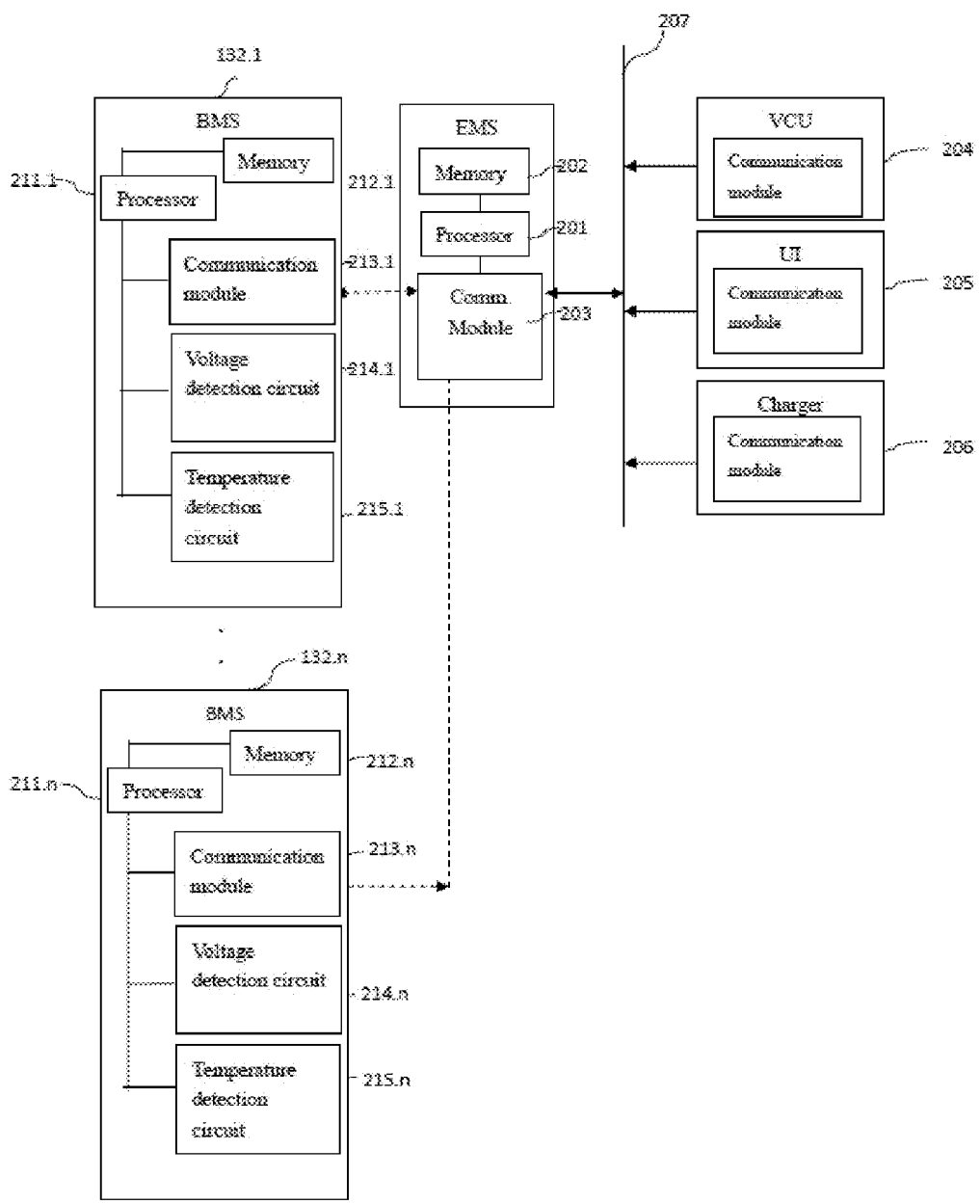
FIG. 2 shows a hardware module diagram of the electric vehicle power management system in accordance with one or more embodiments of the present invention.

FIG. 2 shows a hardware module diagram of the electric vehicle power management system in accordance with various embodiments. In this example, each BMS 132.i is provided with a battery management processor 211.i (i=1, 2, ... n), a battery management memory 212.i (i=1, 2, ... n), a battery management communication module 213.i (i=1, 2, ... n), a voltage detection circuit 214.i (i=1, 2, ... n) and a temperature detection circuit 215.i (i=1, 2, ... n). Each BMS 132.i may detects such data as the voltage and temperature of the corresponding battery module 131.i in real time via the voltage detection circuit 214.i and the temperature detection circuit 215.i, and may store this data in the battery management memory 212.i. The EMS 111 may be provided with an energy management processor 201, an energy management memory 202 and an energy management communication module 203.

In some embodiments, a communication manner of a master-slave architecture may be used when the wireless data channels 113, 114 are used to carry out internal communication of the battery pack 101. For example, the EMS 111 may be used as a master control terminal and each BMS 132.i may be used as a slave terminal. The EMS 111 serving as the master control terminal may determine which BMS 132.i replies, to avoid a potential conflict resulting from the uncertainty of which BMS 132.i needs to communicate with the EMS 111, so as to avoid information jam. Meanwhile, due to the communication manner of the master-slave architecture, the BMS 132.1, 132.2, ..., 132.n need not intercommunicate and may be mutually independent, so that the entire power management system will not be affected by one abnormal BMS in the plurality of BMSs.

To manage each BMS 132.i, the EMS 111 may need to periodically or continuously collect from each BMS 132.i the information of its corresponding battery module 131.i. In the example shown in FIG. 1A, the wireless data channel 113 used by the EMS 111 consists of one wireless frequency channel, which may be simultaneously connected with the EMS 111 and the plurality of BMS 132.1, 132.2, ..., 132.n in order to save resources. Each BMS 132.i may be permanently provided with a unique BMS address ID.i (i=1, 2, ... n). By providing the address ID.i identifying a currently selected BMS in the communication information, the EMS 111 may communicate with one currently selected BMS at one time and after finishing communication with the currently selected BMS, it may communicate with a next selected BMS, and so on, until each BMS in the plurality of BMSs has communicated with the EMS 111. After one such round of communication is finished, a next round of communication may be carried out. In some embodiments, if only one wireless frequency channel is used, the conflict caused by simultaneous communication between the plurality of BMSs and the EMS 111 may be effectively avoided by this communication method.

Figure 3A:
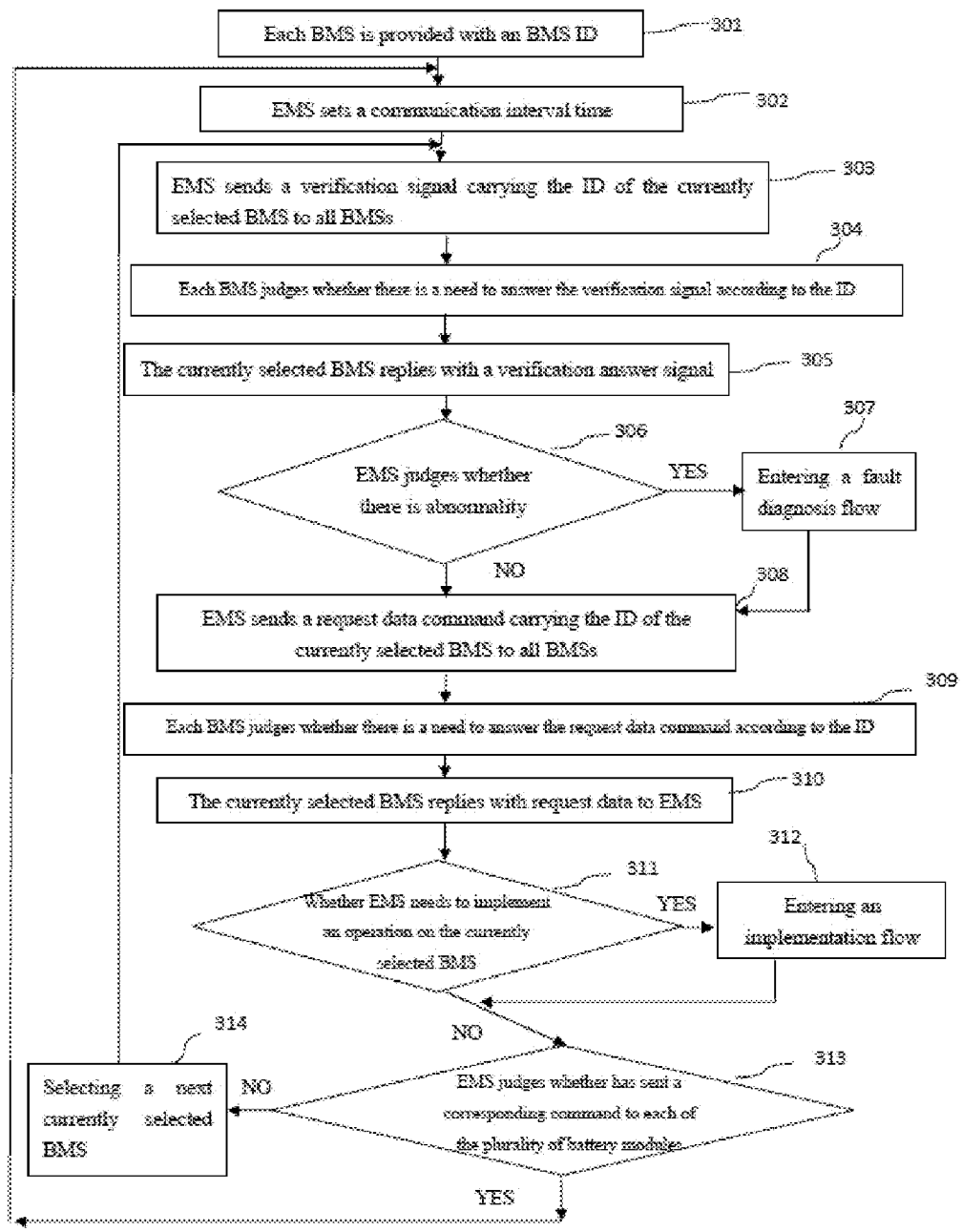
FIG. 3A shows an internal main communication flow diagram of a battery pack using the electric vehicle power management system in accordance with one or more embodiments of the present invention.

The internal communication flow of the battery pack 101 using the power management system of the embodiment as shown in FIG. 1A will be described below in detail with reference to FIG. 1A, FIG. 2 and FIG. 3A. However, it should be understood that techniques described in reference to these figures are not limited to the specific systems shown in FIG. 1A and FIG. 2, but may be used in the various other embodiments described herein.

In step 301, at first, prior to communication, a unique BMS address ID.i (i=1, 2, ... n) may be permanently provided to each BMS 132.i, and the ID information of all the BMSs may be stored in the energy management memory 202 of the EMS 111.

In step 302, prior to each round of communication, the EMS 111 may set a communication interval time, the communication interval time herein may refer to the time interval from the finishing moment of the communication between the energy management system 111 and the currently selected BMS to the starting moment of the communication between the energy management system 111 and a next selected BMS.

Step 303 to step 306 show an abnormality verification process before the EMS 111, which may send a data command to the currently selected battery management system 132.j (j=1, 2, ... n).

In step 303, the energy management processor 201 of the EMS 111 may control the energy management communication module 203 to simultaneously send a verification signal carrying the address ID.j identifying the currently selected BMS 132.j to the battery management communication modules 213.1, 213.2, ... 213.n of all the BMS 132.1, 132.2, ... 132.n through the wireless data channel 113.

In step 304, after each battery management communication module 213.i receives the verification signal from the energy management communication module 203, each battery management processor 211.i may determine whether to answer the verification signal according to the ID.j in the verification signal. Specifically, the battery management processor 211.i may compare/check whether the ID.j in the verification signal is consistent with the ID stored in the memory 212.*i*. If so, the BMS.i may enter step 305 to serve as the currently selected BMS 132.*j* to reply to the EMS 111 with a verification answer signal. If not, the BMS.i may discard the verification signal.

In step 306, the EMS 111 may judge/determined whether there is abnormality associated with the BMS according to the verification answer signal. The abnormal conditions may be, for example, that the EMS 111 did not receive the verification answer signal of the currently selected BMS 132.*j* within a preset time, or that the verification answer signal received by the EMS 111 is a messy code, or that there is an error marker in the verification answer signal received by the EMS 111, etc. If the EMS 111 determines that there is some abnormality associated with the BMS, the EMS 111 may enter a fault diagnosis flow 307.

In the fault diagnosis flow 307, the EMS 111 may first judge the fault type, then may determine whether to start an alarm mechanism based on the fault type. If an alarm mechanism is started, the EMS 111 may send alarm information to a vehicle control unit (VCU), which may perform follow-up fault processing, after which the EMS 111 may return to the main communication flow to carry out step 308. If it is judged that there is no need to start an alarm mechanism, the EMS 111 may terminate the fault diagnosis flow 307 and return to the main communication flow. By providing the abnormality verification process, problems arising in the process of using the wireless data channel may be effectively monitored, so as to process the fault timely and avoid the influence on the follow-up command and answer processing.

If the EMS 111 verifies that there is no abnormality, a request data sending flow of step 308 to step 310 may be carried out.

Specifically, in step 308, the energy management processor 201 of the EMS 111 may control the energy management communication module 203 to simultaneously send a request data command to the battery management communication modules 213.1, 213.2, . . . 213.*n* of all the BMSs 132.1,132.2, . . . 132.*n* through the wireless data channel 113. The request data command may include, for example, a starting marker, the ID.j identifying the currently selected BMS 132.*j*, a command which requests the currently selected BMS 132.*j* to send such common information as the voltage, current, temperature, etc. of the corresponding battery module 131.*j* following the currently selected ID.j, and/or termination marker.

In step 309, after each battery management communication module 213.*i* receives the request data command from the energy management communication module 203, each battery management processor 211.*i* may determine whether to process and answer the command based on the ID.j in the request data command. During operation, each battery management communication module 213.*i* often does not need to completely receive the request data command and may only need to receive the command to the ID.j portion which identifies the currently selected BMS 132.*j*. After a battery management processor 211.*i* determines that the ID.j is consistent with the ID thereof, the battery management processor may continue to receive the command until the command ends and/or a termination marker is received. If the ID.j is not consistent with the ID thereof, the battery management processor need not continue to receive the command and may discards the request data command. In this way, the communication efficiency may be effectively improved.

In step 310, the battery management processor 211.*j* of the currently selected BMS 132.*j* may control the currently selected battery management communication module 213.*j* to reply to the EMS 111 with request data through the wireless data channel 113. after it is determined that there is a need to process and answer the request data command. In these and other embodiments, battery management processors 211 of the BMSs 132 may perform the various functions described herein via hardware circuitry and/or via computer-readable media storing computer-executable software instructions to perform the described functions.

After the currently selected BMS 132.*j* replies to the EMS 111 with the request data, step 311 is carried out, in which the energy management processor 201 of the EMS 111 may determine whether to implement an operation on the currently selected BMS 132.*j*. If so, an implementation flow such as in step 312 may be carried out. The implementing operation herein refers to that the EMS 111 needs to modify the parameters of the currently selected BMS 132.*j* or needs the currently selected BMS 132.*j* to reply with additional information, such as, for example, a battery setting parameter record, etc. The additional information may include any information relating to the previous or current states of the selected BMS 132.*j*, but need not include the previously transmitted common information (e.g., voltage and temperature).

Figure 3B:
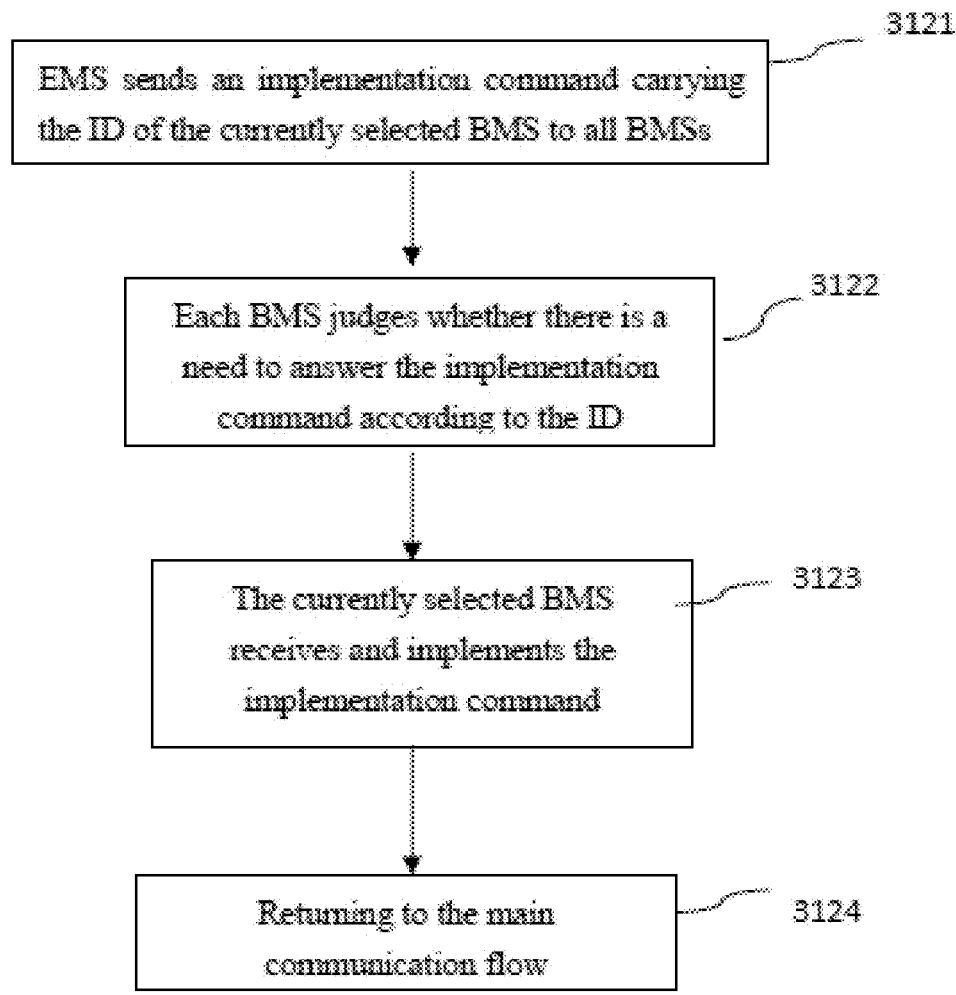
FIG. 3*b* shows an internal implementation flow diagram of the battery pack using the electric vehicle power management system in accordance with one or more embodiments of the present invention.

The specific flow of step 312 is illustrated in the internal implementation flow diagram of the battery pack using the first embodiment as shown in FIG. 3*b*. In this example, in step 3121, the EMS may send an implementation command carrying the address ID.j of the currently selected BMS 132.*j* to each BMS 132.*i*. In step 3122, each BMS 132.*i* may independently determine whether there is a need to answer the implementation command according to the ID. These individual determinations may be similar to the method in step 309 discussed above, in which the BMS 132.*i* may determine whether there is a need to answer the request data command according to the ID. In step 3123, the currently selected BMS 132.*j* may receive and implement the command. After the currently selected BMS 132.*j* implements the command, in step 3124, the main communication flow as shown in FIG. 3A may be carried out again.

After the currently selected BMS 132.*j* has processed and responded to the command sent for the currently selected BMS 132.*j*, the communication of the EMS 111 with the currently selected BMS 132.*j* may be deemed to be finished, and step 313 is carried out. In step 313, the energy management processor 201 of the EMS 111 may determine whether it has finished sending a corresponding command to each one of the plurality of battery modules 131.1, 131.2, . . . , 131.*n*. If not, step 314 is carried out, in which the EMS 111 updates the address ID identifying a currently selected BMS to ID.j+1, so as to select a next currently selected BMS 132.*j*+1. After waiting for the interval time set in step 302, the communication with the next currently selected BMS 132.*j*+1 then may be started in step 303. Thus, the communication of each BMS 132.*i* may be determined by the EMS 111, so that the conflict resulting from the simultaneous reply to the EMS 111 by a plurality of BMSs may be effectively avoided.

In some cases, the EMS 111 may continuously and sequentially update the address ID of a current BMS to continuously select a next currently selected BMS until it has sent a corresponding command to each one of the plurality of BMS 132.1, 132.2, . . . , 132.*n*. It should be noted that, the sequentially updating herein need not be limited to that the plurality of BMS 132.1, 132.2, . . . , 132.*n* that needs to be sequenced according to a certain fixed sequence for communication, but refers to that the EMS non-repeatedly communicate with each one of the plurality of BMSs in each round of communication.

When the EMS 111 has finished sending a corresponding command to each one of the plurality of BMSs 132.1, 132.2, . . . , 132.*n*, it may determine in step 313 that it has finished the current round of communication. At this point, the process may return back to step 302 to start a new round of communication.

FIG. 1B shows another data exchanging diagram of the electric vehicle power management system according to various embodiments. The communication manner of the master-slave architecture is also adopted in this example. The difference from the embodiment shown in FIG. 1A lies in that, in this example, the wireless data channel 114 consists of a plurality of wireless frequency channels 114.1, 114.2, . . . , 114.*n*. Each one of the wireless frequency channels 114.1, 114.2, . . . , 114.*n* may correspond to a specific BMS 132.*i* (i=1, 2, . . . n), and the EMS 111 may communicate with each BMS 132.*i* by using the wireless frequency channel 114.*i* (i is equal to 1, 2, . . . n) corresponding to that BMS 132.*i* (i=1, 2, . . . n). Since each BMS 132.*i* may be provided with a unique wireless frequency channel 114.*i*, even if multiple BMSs communicate with the EMS 111 at the same time, communication collisions and/or conflict may be avoided. Moreover, addresses (ID.i) for distinguishing the battery modules, which are optional in this example, may be stored in the EMS 111. The EMS 111 may associate the address (ID.i) of each battery module with its corresponding wireless frequency channel 114.*i*, and in this way, the EMS 111 may send the commands of the battery modules to the battery modules through the corresponding wireless channels.

Figure 4:
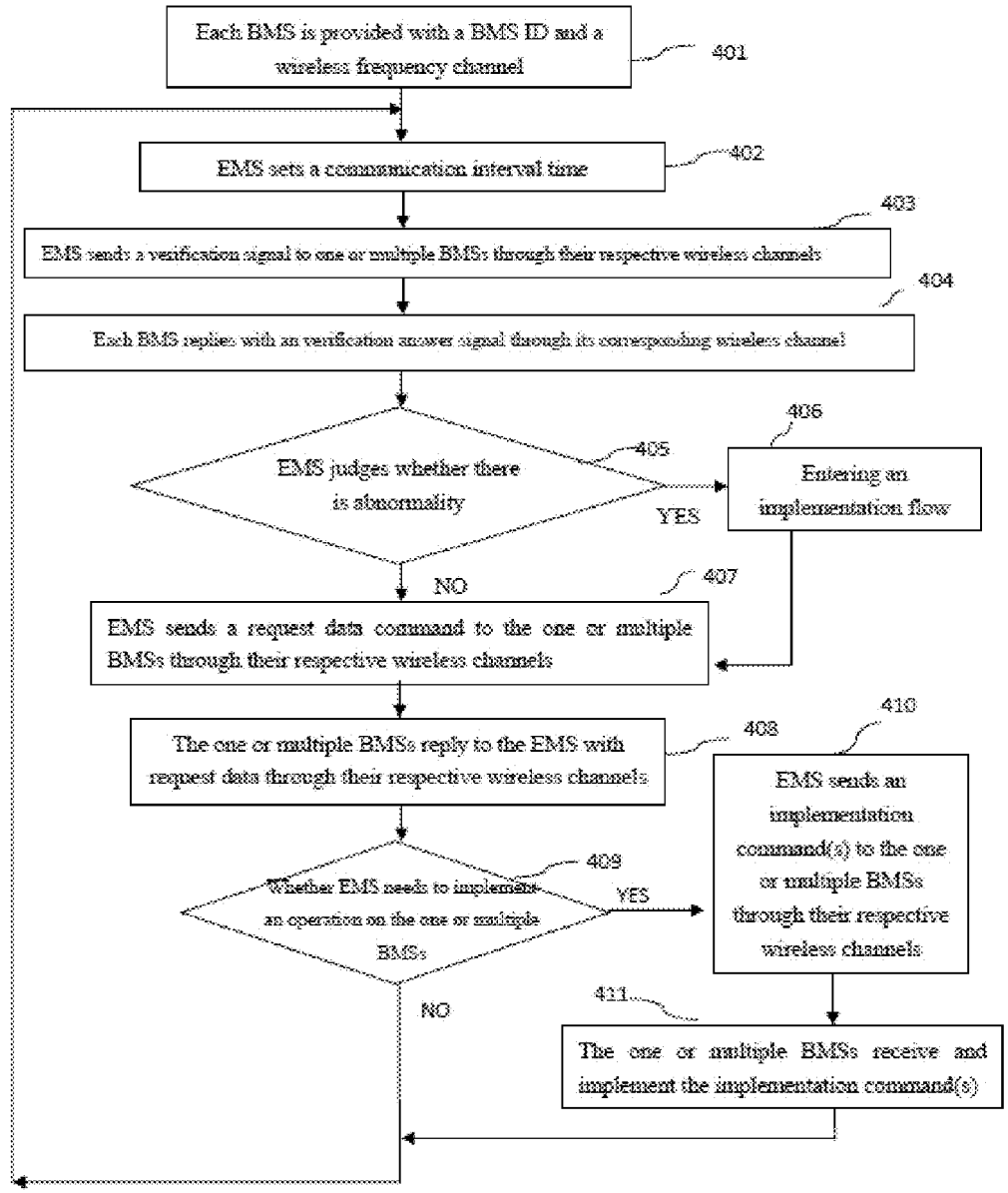
FIG. 4 shows an internal communication flow schematic diagram of a battery pack using the electric vehicle power management system in accordance with one or more embodiments of the present invention.

The internal communication flow of the battery pack 101 using the embodiment as shown in FIG. 1B will be described below in detail with reference to FIG. 2 and FIG. 4. However, it should be understood that techniques described in reference to these figures are not limited to the specific systems shown in FIG. 1B and FIG. 4, but may be used in the various other embodiments described herein.

In step 401, at first, prior to communication, each BMS 132.*i* may be permanently provided with a unique BMS address ID.i (i=1, 2, . . . n) and a unique wireless frequency channel 114.*i*, and the ID information of all the BMSs and the information of the corresponding wireless frequency channels may be stored in the energy management memory 202 of the EMS 111.

In step 402, prior to each round of communication, the EMS 111 may set a communication interval time, the communication interval time herein may refer to the time interval from the finishing moment of the current communication between the EMS 111 and the BMSs to the starting moment of the next communication between the EMS 111 and the BMSs. The energy management processor 201 may control the duration of the time interval as required.

Step 403 to step 405 show an abnormality verification process before the EMS 111 collects from a BMS 132.*i* the information of its corresponding battery module 131.*i*. Specifically, in step 403, the energy management processor 201 of the EMS 111 may select multiple BMSs that need communication to simultaneously communicate with them, the energy management communication module 203 may send a verification signal to the battery management communication modules of the selected BMSs through their respective wireless channels. It should be noted that the multiple selected BMSs herein may or may not be all the BMSs in the battery pack 101. For example, the EMS 111 also may only select one BMS 132.*i* and send the verification signal to the BMS 132.*i* through its corresponding wireless channel 114.*i*.

Since each wireless channel 114.*i* corresponds to a single BMS 132.*i* in this example, only the BMS 132.*i* using the wireless channel 114.*i* may receive the verification signal sent via the wireless channel 114.*i*. In step 404, after receiving the verification signal, one or more battery management communication modules may reply to the EMS 111 with their verification answer signals through their respective wireless channels. If the EMS 111 selected multiple BMSs to simultaneously communicate with them, the EMS 111 may send a same verification to these BMSs simultaneously. When these BMSs reply with verification answer signals, the EMS 111 may distinguish these verification answer signals from the multiple BMSs via their corresponding wireless frequency channels. Of course, in other embodiments, other methods can be used to distinguish the verification answer signals from the multiple BMSs. For example, the EMS 111 may send to each BMS.i a verification signal added with its corresponding address ID.i and each BMS.i may reply to the EMS 111 with a verification answer signal added with its corresponding address ID.i. In other examples, the EMS 111 may send to the multiple BMSs a same verification signal, but each BMS.i may reply to the EMS 111 with a verification answer signal added with its corresponding address ID.i.

In step 405, the EMS 111 may determine whether there is abnormality associated with one or more BMS(s) based on verification answer signal(s) received from the BMS(s). If the energy management system 111 determines that there is an abnormality, the energy management system 111 may enter a fault diagnosis flow 406. The general abnormal conditions and the fault diagnosis flow 406 may be the same as those discussed above in reference to FIG. 1A.

If the EMS 111 verifies that there is no abnormality, a request data sending flow of step 407 to step 408 will be carried out. For example, the EMS 111 may send a request data command to the previously selected BMSs through their respective wireless frequency channels, and the selected BMSs may reply to the EMS with request data through their respective wireless frequency channels. The way the EMS 111 sends the request data command and the BMSs reply to the EMS 111 with request data are similar to the way used by the abnormality verification process described above.

After the selected BMSs have replied to the EMS with request data through their respective wireless frequency channels, step 409 may carried out. In step 409, the energy management processor 201 of the EMS 111 may determine whether there is a need to implement operations on the selected BMSs. If so, in step 410 and step 411, the EMS 111 may send implementation commands to the BMSs through their respective wireless frequency channels 114.*i*, and the BMSs may receive and implement the implementation commands. In these and other embodiments, the energy management processor 201 of the EMS 111 may perform the various functions described herein via hardware circuitry and/or via computer-readable media storing computer-executable software instructions to perform the described functions.

After the selected BMSs have finished processing and answering, the current communication of the EMS 111 with the BMSs is deemed to be finished, and after waiting for the interval time set in step 402, the next communication of the EMS 111 with the BMSs may be started from step 402.

As shown in FIG. 1A, FIG. 1B and FIG. 2, the battery pack 101 may communicate with various peripheral equipment of the battery pack through the EMS 111. Specifically, the energy management communication module 203 of the EMS 111 may send communication data to certain peripheral equipment, or may receive the communication data from peripheral equipment, through an external data bus 207. The peripheral equipment in such cases may include, for example, a vehicle control unit (VCU) 204, a charging unit (charger) 206, and a user interface (UI) 205. The external data bus 207 may be connected with the communication modules of such peripheral equipment.

In some embodiments, an external data bus 207 may adopt a high-speed wired data channel, and the communication mode can select a CAN bus manner or the like. In other examples, the external data bus 207 may adopt a wireless communication channel.

In some cases, the wireless data channels 113 or 114 connecting to the interior of the battery pack 101 may be mutually independent from the external data bus 207. Accordingly, the communication stability of the power management system and the vehicle control unit (VCU) may be effectively guaranteed in such cases, and the interference on the communication stability of the VCU 204 with other systems may be more effectively avoided.

Additional embodiments may provide a battery pack 101 of an electric vehicle which includes the above-mentioned plurality of battery modules 131.1, 131.2, ..., 131.n, and the battery pack 101 uses the above-mentioned electric vehicle power management system.

Further embodiments also may provide an electric vehicle including the above-mentioned battery pack 101, battery modules 131, etc.

Figure 5:
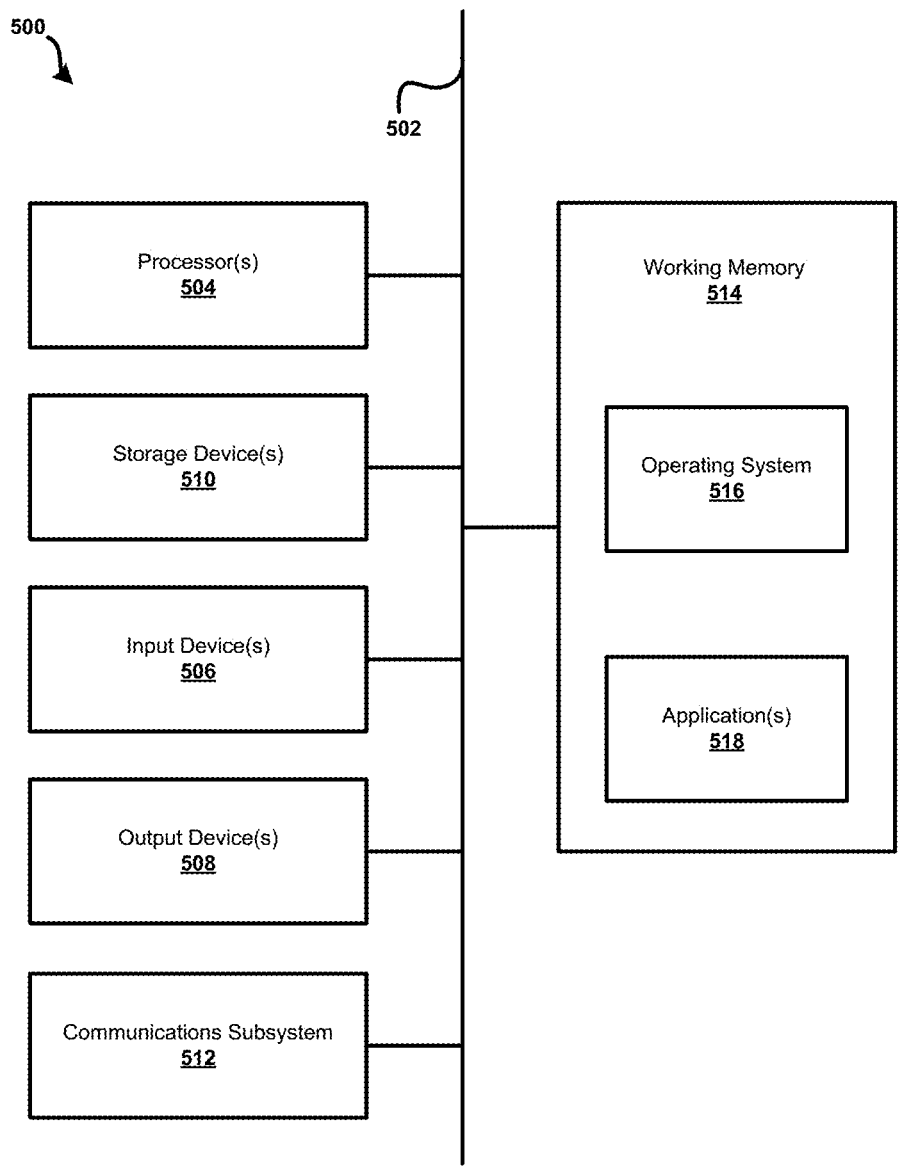
FIG. 5 shows an example block diagram for a computing system upon which various features of the present disclosure may be provided.

Referring now to FIG. 5, an example block diagram for a computer system or other computer device 500 which may be integrated into and/or operatively connected to the battery management systems (BMSs), energy management systems (EMSs), vehicle control units (VCUs) described herein, as well as any other components described above. One or more computer systems or other computer devices 500 may control one or more aspects of the electric devices and/or components described above. For example, one or more computer devices 500 may be used to implement the various battery management systems 132 and battery module groups 112, energy management systems 111, vehicle control units 204, user interfaces 205, charging units 206 described above. Accordingly, such components may include some or all of the features described below in reference to computer device 500. In some examples, the computer system or other computer devices 500 may include a tablet computer, personal data assistant, smartphone, gaming console, and/or a dedicated computer system for controlling the electric vehicle. Any particular one of the previously-described computing devices may be wholly or at least partially configured to exhibit features similar to the computer system 500.

The computer device 500 is shown comprising hardware elements that may be electrically coupled via a bus 502 (or may otherwise be in communication, as appropriate). The hardware elements may include a processing unit with one or more processors 504, including without limitation one or more general-purpose processors and/or one or more special-purpose processors (such as digital signal processing chips, graphics acceleration processors, and/or the like); one or more input devices 506, which may include without limitation a steering wheel, a climate control button or other user input receiving buttons, and/or the like; and one or more output devices 508, which may include without limitation a presentation device (e.g., a computer screen), a GPS, and/or the like.

The computer system 500 may further include (and/or be in communication with) one or more non-transitory storage devices 510, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 500 might also include a communications subsystem 512, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 512 may permit data to be exchanged with a network (such as the network described below, to name one example), other computer systems, and/or any other devices described herein. In many embodiments, the computer system 500 will further comprise a working memory 514, which may include a random access memory and/or a read-only memory device, as described above.

The computer device 500 also may comprise software elements, shown as being currently located within the working memory 514, including an operating system 516, device drivers, executable libraries, and/or other code, such as one or more application programs 518, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 510 described above. In some cases, the storage medium might be incorporated within a computer system, such as computer system 500. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 500) to perform methods in accordance with various embodiments of the disclosure. According to a set of embodiments, some or all of the procedures of such methods are performed by the computer system 500 in response to processor 504 executing one or more sequences of one or more instructions (which might be incorporated into the operating system 516 and/or other code, such as an application program 518) contained in the working memory 514. Such instructions may be read into the working memory 514 from another computer-readable medium, such as one or more of the storage device(s) 510. Merely by way of example, execution of the sequences of instructions contained in the working memory 514 may cause the processor(s) 504 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 500, various computer-readable media might be involved in providing instructions/code to processor(s) 504 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 510. Volatile media may include, without limitation, dynamic memory, such as the working memory 514.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 504 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 512 (and/or components thereof) generally will receive signals, and the bus 502 then might carry the signals (and/or the data, instructions, etc. carried by the signals) to the working memory 514, from which the processor(s) 504 retrieves and executes the instructions. The instructions received by the working memory 514 may optionally be stored on a non-transitory storage device 510 either before or after execution by the processor(s) 504.

It should further be understood that the components of computer device 500 can be distributed across a network. For example, some processing may be performed in one location using a first processor while other processing may be performed by another processor remote from the first processor. Other components of computer system 500 may be similarly distributed. As such, computer device 500 may be interpreted as a distributed computing system that performs processing in multiple locations. In some instances, computer system 500 may be interpreted as a single computing device, such as a distinct laptop, desktop computer, or the like, depending on the context.

Examples of Certain Embodiments

In a first example embodiment, an electric vehicle power management system (100) may be provided for managing a plurality of battery modules (131.1, 131.2, . . . , 131.$n$), wherein each battery module (131.$i$) ($i$=1, 2, . . . , n) in the plurality of battery modules (131.1, 131.2, . . . , 131.$n$) comprises one or more battery cells, the electric vehicle power management system comprises: a plurality of battery management systems (BMS) (132.1,132.2, . . . , 132.$n$), wherein each battery management system (132.$i$) ($i$=1, 2, . . . , n) in the plurality of battery management systems (BMS) (132.1,132.2, . . . , 132.$n$) is connected with a corresponding battery module (131.$i$) for managing one or more battery cells in the corresponding battery module (131.$i$); an energy management system (EMS) (111), wherein the energy management system (111) manages the plurality of battery management systems (132.1, 132.2, . . . , 132.$n$), wherein the electric vehicle power management system further comprises: a wireless data channel (113), the wireless data channel (113) consists of one wireless frequency channel for data communication between the energy management system (111) and the plurality of battery management systems (132.1,132.2, . . . , 132.$n$); the energy management system (111) is provided with an energy management processor (201) and an energy management communication module (203); each battery management system (132.$i$) is provided with a battery management processor (211.$i$) and a battery management communication module (213.$i$); each battery management system (132.$i$) is provided with a unique battery management system address (ID.$i$); the energy management communication module (203) uses the wireless frequency channel to simultaneously send a command to each battery management system (132.$i$), and the command carries an address (ID.$j$) identifying a currently selected battery management system (132.$j$) ($j$=1, 2, . . . , n); each battery management communication module (213.$i$) receives the command from the energy management communication module (203); each battery management processor (211.$i$) judges whether to process and answer the received command according to the address (ID.$j$) in the command; the battery management processor (211.$j$) of the currently selected battery management system (132.$j$) judges that there is a need to process and answer the received command, and then processes and answers the received command.

A second example embodiment may include the electric vehicle power management system of the first example embodiment, wherein the command is a request data command; when the battery management processor (211.$j$) of the currently selected battery management system (132.$j$) judges that there is a need to process and answer the received command, the battery management communication module (213.$j$) of the currently selected battery management system (132.$j$) uses the wireless frequency channel to reply to the energy management system (111) with request data.

A third example embodiment may include the electric vehicle power management system of the first example embodiment, wherein after the currently selected battery management system (132.$j$) finished processing and answering the command sent to the currently selected battery management system (132.*j*), the energy management system (111) updates the address (ID.j+1) identifying a battery management system to be selected and select a next currently selected battery management system (132.*j*+1) accordingly.

A fourth example embodiment may include the electric vehicle power management system of the third example embodiment, wherein the energy management system (111) continuously and sequentially updates the address identifying a battery management system to be selected and thus continuously select a next currently selected battery management system until having finished sending a corresponding command to each one of the plurality of battery management systems (131.1, 131.2, . . . , 131.*n*).

A fifth example embodiment may include the electric vehicle power management system of the first example embodiment, wherein before sending the command to the battery management systems (131.1, 131.2, . . . , 131.*n*), the energy management system (111) sends a verification signal carrying the address (ID.j) identifying the currently selected battery management system (132.*j*) (j=1, n) to the battery management systems (131.1, 131.2, . . . , 131.*n*), and judges whether there is abnormality according to a verification answer signal replied by the currently selected battery management system (132.*j*) (j=1, n).

A sixth example embodiment may include the electric vehicle power management system of the fifth example embodiment, wherein if the energy management system (111) judges that there is abnormality, the energy management system (111) enters a fault diagnosis flow.

A seventh example embodiment may include the electric vehicle power management system of the third example embodiment, wherein the energy management system (111) sets a communication interval time, so that the processor (201) of the energy management system (111) controls the time interval from the finishing moment of the communication with the currently selected battery management system (132.*j*) to the starting moment of the communication with a next selected battery management system (132.*j*+1).

In an eighth example embodiment, an electric vehicle power management system (100) used for managing a plurality of battery modules (131.1, 131.2, . . . , 131.*n*) may be provided, wherein each battery module (131.*i*) (i=1, 2, . . . n) in the plurality of battery modules (131.1, 131.2, . . . , 131.*n*) comprises one or more battery cells, the electric vehicle power management system comprises: a plurality of battery management systems (BMS) (132.1, 132.2, . . . , 132.*n*), wherein each battery management system (132.*i*) (i=1, 2, . . . , n) in the plurality of battery management systems (132.1,132.2, . . . , 132.*n*) corresponds to a battery module (131.*i*), and each battery management system (132.*i*) is used for managing one or more battery cells in the battery module (131.*i*); an energy management system (EMS) (111), wherein the energy management system (111) manages the plurality of battery management systems (132.1, 132.2, . . . , 132.*n*), wherein the electric vehicle power management system further comprises: a wireless data channel (114), the wireless data channel (114) consists of a plurality of wireless frequency channels (114.1, 114.2, . . . , 114.*n*), and each battery management system (132.*i*) in the plurality of battery management systems (132.1, 132.2, . . . , 132.*n*) uses a corresponding wireless frequency channel (114.*i*) in the plurality of wireless frequency channels (114.1, 114.2, . . . , 114.*n*) to communicate with the energy management system (111); the energy management system (111) is provided with an energy management communication module (203); each battery management system (132.*i*) in the plurality of battery management systems (BMS) (132.1, 132.2, . . . , 132.*n*) is provided with a battery management communication module (213.*i*); the energy management communication module (203) uses the wireless frequency channels to send a command to one battery management system (132.*i*) in the plurality of battery management systems or to multiple battery management systems in the plurality of battery management systems simultaneously; the one or multiple battery management systems in the plurality of battery management systems receive the command through their respective battery management communication modules, and process and answer the command after receiving the command.

A ninth example embodiment may include the electric vehicle power management system of the eighth example embodiment, wherein each one of the plurality of wireless frequency channels (114.1, 114.2, . . . , 114.*n*) corresponds to a unique battery management system address (ID).

A tenth example embodiment may include the electric vehicle power management system of the eighth example embodiment, wherein before sending the command to the one or multiple battery management systems, the energy management system (111) sends a verification signal to the one or multiple battery management systems and judges whether there is abnormality according to verification answer signal(s) replied by the one or multiple battery management systems.

An eleventh example embodiment may include the electric vehicle power management system of the tenth eighth example embodiment, wherein if the energy management system (111) judges that there is abnormality, the energy management system (111) enters a fault diagnosis flow.

A twelfth example embodiment may include the electric vehicle power management system of the first example embodiment, wherein the energy management system (111) sets a communication interval time, so that the processor (201) of the energy management system (111) controls the time interval from the current communication with the battery management systems to the next communication with the battery management systems.

A thirteenth example embodiment may include the electric vehicle power management system of any of the first through the twelfth example embodiments, further comprising: an external data bus (207), wherein the external data bus (207) is connected with the energy management system (111) for sending communication data from the energy management system (111) or receiving communication data from outside; the external data bus is in communication connection with at least one of a vehicle control unit (204), a charging unit (206) and a user interface (205), to carry out bidirectional data communication.

A fourteenth example embodiment may include a battery pack (101) of an electric vehicle, wherein the battery pack (101) comprises: a plurality of battery modules (131.1, 131.2, . . . , 131.*n*), and the battery pack (101) uses the electric vehicle power management system of any of the first through the thirteenth example embodiments.

A fifteenth example embodiment may include an electric vehicle, comprising the battery pack (101) of the electric vehicle of the fourteenth example embodiment.

Although the present invention has been described with reference to the specific embodiments shown in the drawings, it should be understood that the charging system and the charging method provided by the present invention can have a variety of variations without departing from the spirit, scope and background of the present invention. Those of ordinary skill in the art should be still aware that, parameters in the embodiments disclosed by the present invention can be changed in different manners, and these changes shall fall within the spirit and scope of the present invention and the claims.

What is claimed is:

1. An electric vehicle power management system for managing a plurality of battery modules, the electric vehicle power management system comprising:
    a plurality of battery management systems; and
    an energy management system comprising an energy management processor and an energy management communication module, wherein the energy management system is operatively connected to each battery management system via a unique wireless channel and is configured to:
        select a first wireless channel from a plurality of wireless channels, the selected first wireless channel corresponding to a unique wireless channel of a first selected battery management system; and
        transmit a first command to the first selected battery management system using the selected first wireless channel; and,
    wherein each of the plurality of battery management systems is configured to:
        receive commands from the energy management system transmitted via its respective unique wireless frequency channel; and
        upon receiving a command from the energy management system transmitted via its respective unique wireless frequency channel, process and respond to the received command;
        receive a response to the first command from the first selected battery management system;
        after receiving the response from the first selected battery management system, determine a second wireless frequency channel from the plurality of wireless frequency channels in the wireless data channel, the determined second wireless frequency channel corresponding to the unique wireless frequency channel of a second selected battery management system;
        transmit a second command to the second selected battery management system using the determined second wireless frequency channel;
        set a communication interval time;
        identify a finishing time, the finishing time being a time of termination of communications between the energy management system and the first selected battery management system, wherein the communication interval time is initiated after the finishing time; and
        transmit the second command to the second selected battery management system upon completion of the communication interval.

2. The electric vehicle power management system of claim 1, wherein the first command includes a unique address identifying the first selected battery management system.

3. The electric vehicle power management system of claim 1, wherein the first command does not include a unique identifier associated with the first selected battery management system.

4. The electric vehicle power management system of claim 1, wherein each of the plurality of wireless channels corresponds to a unique battery management system address associated with one of the plurality of battery management systems.

5. The electric vehicle power management system of claim 1, wherein the energy management system is further configured to:
    before transmitting the first command to the first selected battery management system, transmit a verification signal;
    receive a response to the verification signal from the first selected battery management system; and
    determine whether there is an abnormality associated with the first selected battery management system based on the response received to the verification signal.

6. The electric vehicle power management system of claim 5, wherein the energy management system is further configured to:
    upon determining that there is an abnormality associated with the first selected battery management system, perform a fault diagnosis process.

7. The electric vehicle power management system of claim 1, further comprising:
    an external data bus connected to the energy management system, the external data bus configured to transmit communication data from the energy management system and to receive communication data for the energy management system,
    wherein the external data bus is configured for bidirectional communication with at least one of a vehicle control unit, a charging unit, or a user interface.

8. The electric vehicle power management system of claim 1, wherein the energy management system is configured to continuously and sequentially update an address identifying one of the plurality of battery management systems to be selected.

9. A method for managing a plurality of battery modules, the method being implemented by an electric vehicle power management system comprising a plurality of battery management systems and an energy management system comprising an energy management processor and an energy management communication module, wherein the energy management system is operatively connected to each battery management system via a unique wireless channel, the method comprising:
    selecting, by the energy management system, a first wireless channel from a plurality of wireless channels, the selected first wireless channel corresponding to a unique wireless channel of a first selected battery management system;
    transmitting, by the energy management system, a first command to the first selected battery management system using the selected first wireless channel;
    receiving, at each of the plurality of battery management systems, the commands from the energy management system transmitted via its respective unique wireless frequency channel; and
    upon receiving a command from the energy management system transmitted via its respective unique wireless frequency channel, at each of the plurality of battery management systems, process and respond to the received command
    receiving, by the energy management system, a response to the first command from the first selected battery management system;
    after receiving the response from the first selected battery management system, determining, by the energy management system, a second wireless frequency channel from the plurality of wireless frequency channels in the wireless data channel, the determined second wireless frequency channel corresponding to the unique wireless frequency channel of a second selected battery management system:
transmitting, by the energy management system, a second command to the second selected battery management system using the determined second wireless frequency channel;
setting, by the energy management system, a communication interval time;
identify, by the energy management system, a finishing time, the finishing time being a time of termination of communications between the energy management system and the first selected battery management system, wherein the communication interval time is initiated after the finishing time; and
transmit, by the energy management system, the second command to the second selected battery management system upon completion of the communication interval.

10. The method of claim 9, wherein the first command includes a unique address identifying the first selected battery management system.

11. The method of claim 9, wherein the first command does not include a unique identifier associated with the first selected battery management system.

12. The method of claim 9, wherein each of the plurality of wireless channels corresponds to a unique battery management system address associated with one of the plurality of battery management systems.

13. The method of claim 9, further comprising:
before transmitting the first command to the first selected battery management system, transmitting, by the energy management system, a verification signal;
receiving, by the energy management system, a response to the verification signal from the first selected battery management system; and
determining, by energy management system, whether there is an abnormality associated with the first selected battery management system based on the response received to the verification signal.

14. The method of claim 13, further comprising:
upon determining that there is an abnormality associated with the first selected battery management system, performing, by the energy management system, a fault diagnosis process.

15. The method of claim 9, further comprising continuously and sequentially updating, by the energy management system, an address identifying one of the plurality of battery management systems to be selected.

* * * * *